US005672944A

United States Patent [19]
Gokhale et al.

[11] Patent Number: 5,672,944
[45] Date of Patent: Sep. 30, 1997

[54] METHOD AND APPARATUS FOR MINIMIZING TORQUE RIPPLE IN A DC BRUSHLESS MOTOR USING PHASE CURRENT OVERLAP

[75] Inventors: Kalyan P. Gokhale, Shelby Township, Macomb County, Mich.; Dennis L. Mueller, Spring Valley, Ohio

[73] Assignee: ITT Automotive Electrical Systems Inc., Auburn Hills, Mich.

[21] Appl. No.: 735,150

[22] Filed: Oct. 22, 1996

Related U.S. Application Data

[63] Continuation of Ser. No. 302,065, Sep. 7, 1994, abandoned.
[51] Int. Cl.[6] .................................................. H02P 6/10
[52] U.S. Cl. ..................... 318/254; 318/448; 318/461; 318/484; 318/702
[58] Field of Search ................................ 318/138, 254, 318/439, 445, 446, 448, 461, 463, 484, 702

[56] References Cited

U.S. PATENT DOCUMENTS

| | | |
|---|---|---|
| 3,419,782 | 12/1968 | Sheldrake et al. . |
| 4,039,911 | 8/1977 | Tanikoshi . |
| 4,249,116 | 2/1981 | Hieda .................................. 318/254 |
| 4,262,236 | 4/1981 | Gelenius et al. . |
| 4,292,575 | 9/1981 | Kuhnlein et al. . |
| 4,412,159 | 10/1983 | Uzuka .................................. 318/254 |
| 4,651,067 | 3/1987 | Ito et al. .............................. 318/254 |
| 4,658,190 | 4/1987 | Miyazaki et al. ...................... 318/254 |
| 4,928,042 | 5/1990 | Harms et al. . |
| 5,191,269 | 3/1993 | Carbolante .......................... 318/254 |

OTHER PUBLICATIONS

IEEE Transactions on Industry Applications 25 (1989) May/Jun., No. 3, New York, U.S., vol. 25, No. 3, pp. 441–450.

*Primary Examiner*—Bentsu Ro
*Attorney, Agent, or Firm*—J. Gordon Lewis; Thomas N. Twomey

[57] ABSTRACT

A method for minimizing torque ripple in a permanent magnet brushless DC motor includes the steps of energizing a first winding of the motor to generate a first current, energizing a second winding of the motor to generate a second current, and overlapping the first and second currents in time by a preselected time to reduce torque ripple. The structure for performing the method includes conventional brushless DC motor drive circuitry responsive to a motor rotor position signal, and a speed control signal, to sequentially generate a gate drive signal for driving a respective semiconductor switch to energize each winding of the motor. The structure further includes a phase overlapping circuit interposed between the conventional brushless DC motor control circuitry output and the semiconductor switches used to energize each winding of the motor. The phase current overlap circuit includes a monostable multi-vibrator for generating a "one-shot." The pulse width or duration of the "one-shot" determines the extent of the phase current overlap. The overlapping circuit detects transitions on the gate drive signal lines, and in response generates a trigger signal. The trigger signal triggers generation of the "one-shot." The overlapping circuit maintains two of its gate drive signals for the duration of the "one-shot."

17 Claims, 4 Drawing Sheets

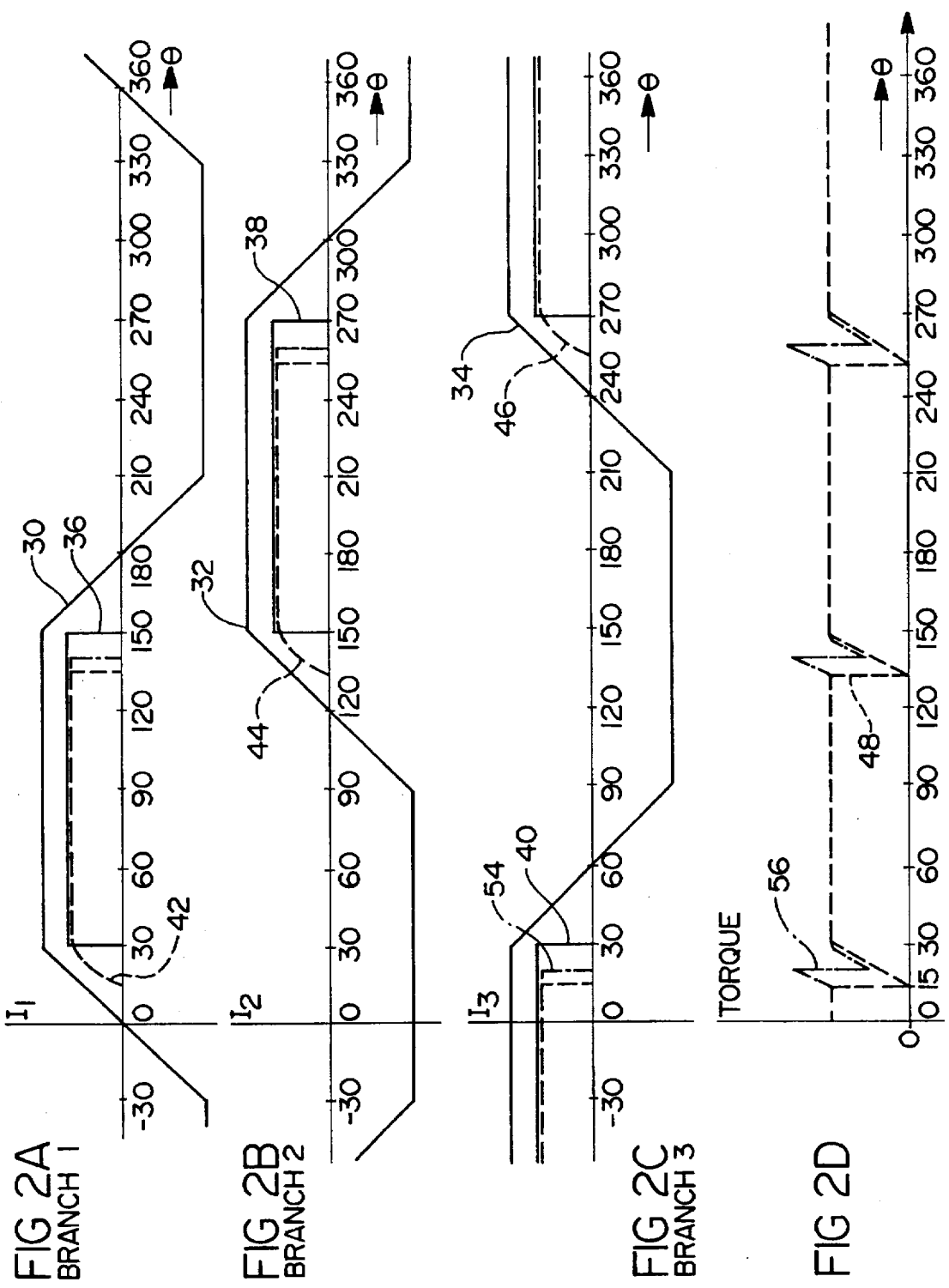

FIG 4A
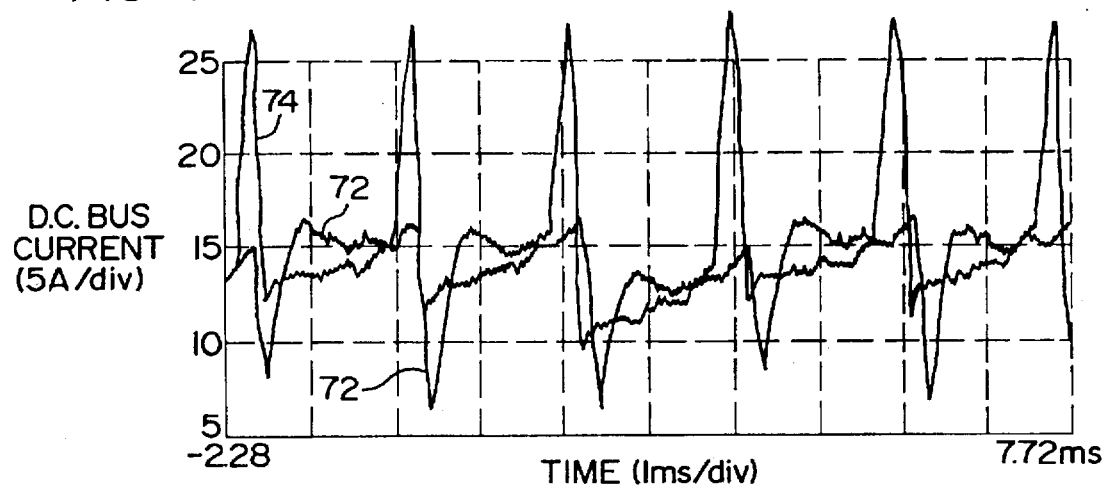
FIG 4B
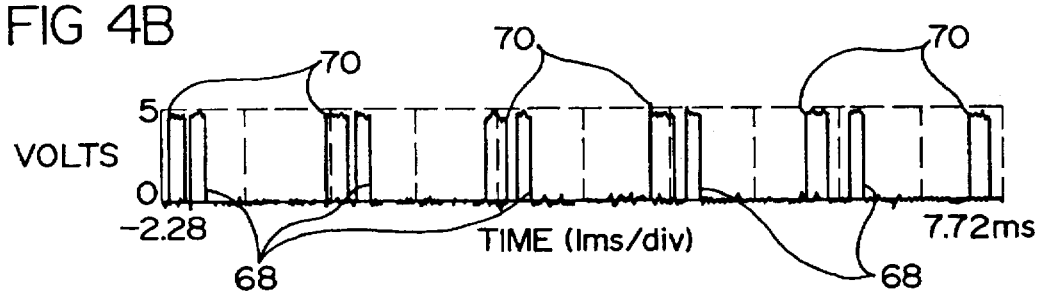
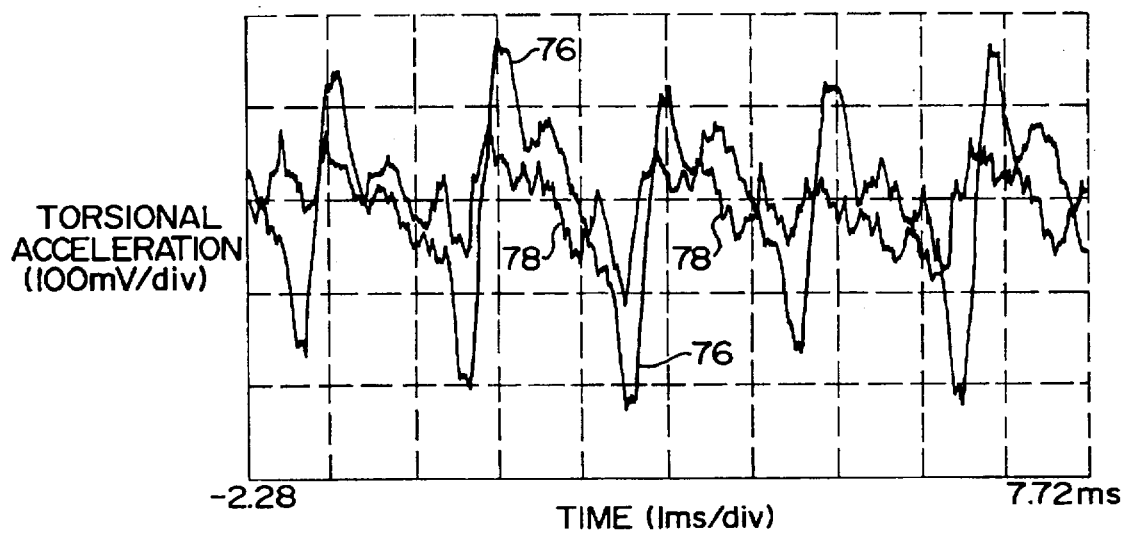
FIG 4C

METHOD AND APPARATUS FOR MINIMIZING TORQUE RIPPLE IN A DC BRUSHLESS MOTOR USING PHASE CURRENT OVERLAP

This application is a continuation of application Ser. No. 08/302,065 filed on Sep. 7, 1994, now abandoned.

TECHNICAL FIELD

This invention relates generally to a system for controlling a brushless DC multi-phase motor, and more specifically, to a method and apparatus for minimizing torque ripple of a permanent magnet brushless DC motor using phase currant overlap.

BACKGROUND OF THE INVENTION

It is well known that multi-phase brushless DC motors are constructed from a plurality of windings. When each of these windings in the stator is sequentially energized, the motor rotor rotates. It is further known that each winding develops a so-called back-electromotive force (back-emf) during rotation. In order to achieve maximum efficiency the windings must be driven by an ideally rectangular current pulse positioned in the middle of the positive half-cycle of back-emf generated by a respective winding. However, due to the non-zero inductance of each winding (i.e., stator winding inductance), as well as the back-emf generated by the windings (which opposes the battery voltage), the build-up of current for an incoming phase (i.e., the next winding to be energized in sequence), is significantly slowed (i.e., the current has a non-zero rise time). Thus, the maximum current in each winding does not occur instantaneously after energization. Accordingly, it is well-known in the art to advance the time when each winding is energized so that the current, which is known to be proportional to output torque, reaches its maximum value at the same time the back-emf attains its maximum value. However, since each winding is energized only for its respective portion of a motor rotor revolution (e.g., each winding of a three phase motor carries current for 120 electrical degrees), each winding is deenergized prior to the time when it would ideally be tuned off by an amount corresponding to the time advanced.

A problem arises, however, during the transition (commutation) interval, when the outgoing winding is being deenergized and the incoming phase is being turned on. The problem during this interval is that there is a significant loss in the developed motor torque. The reason for this phenomena is that while the current rise time of the incoming phase, as discussed above, is relatively slow, the fall time of the outgoing phase current is relatively quick, due to a snubber voltage that aids the winding back-emf to drive the phase current to zero. Thus, during the commutation interval, none of the windings of the motor are carrying any appreciable current. Accordingly, since developed torque is proportional to the current flowing through the windings, a torque "dip" due to the drop in current is observed. These periodic (three times the electrical frequency) "dips" in the motor torque inject torsional forces into the mounting structure of the motor end therefore can cause an undesireable acoustic noise at that frequency.

One solution proposed by the prior art is to include an "inertial disk" on such DC motors (on the stator). The additional mass, which increases the moment of inertia of the system, is effective to "dampen" torsional acceleration arising from the above-described torque ripple or "dips." However, the solution has proved unsatisfactory insofar as the disk increases cost, and increases the overall weight of the motor assembly, which is particularly disadvantageous when such a motor installed in an automobile. Additionally, the added mass leads to decreased fuel efficiency.

Accordingly, there is a need to provide an improved method and apparatus for controlling a multi-phase DC motor, such as a three-phase brushless DC motor, that minimizes or eliminates one or more of the problems as set forth above.

SUMMARY OF THE INVENTION

The present invention provides an improved method for energizing the phase windings or windings of a multi-phase motor for reducing motor torque ripple. The method comprises three basic steps. The first step includes energizing a first winding of the motor to generate a first phase current. The second step includes energizing a second winding of the motor to generate a second phase current. Finally, the third basic step includes overlapping the first and second phase currents by a preselected time to reduce motor torque ripple. In the preferred embodiment, each winding of the motor has a respective nominal turn-on and turn-off times. Further, the overlapping step includes the substep of delaying deenergization of the first winding relative to the nominal first winding turn-off time so that the first and second winding currents overlap by the preselected time. By extending the time in which the first winding is energized, which is carrying full current, until the second winding has sufficiently built up a respective second phase current an improved control is established for minimizing or reducing excess fluctuations or variations in the total motor torque, thus reducing motor torque ripple.

A structure is provided for implementing the preferred embodiment to control a brushless DC motor having a plurality of phases to reduce motor torque ripple. The structure comprises a means for energizing a first one of the windings to generate a first phase current during a first interval, and means for energizing a second one of the windings to generate a second phase current during a second interval. The structure departs from the prior art by providing a means for overlapping the first and second intervals for a preselected time such that the torque variation is reduced, thus reducing motor torque ripple.

BRIEF DESCRIPTION OF THE DRAWING

FIG. 2A is a timing diagram depicting back-emf and current waveforms of a first phase of a three phase brushless DC motor, including a current waveform generated in accordance with a preferred embodiment of the present invention.

FIG. 2B is a timing diagram depicting back-emf and current waveforms of a second phase of a three phase brushless DC motor, including a current waveform generated in accordance with a preferred embodiment of the present invention.

FIG. 2C is a timing diagram depicting back-emf and current waveforms of a third phase of a three phase brushless DC motor, including a current waveform generated in accordance with a preferred embodiment of the present invention.

FIG. 2D is a timing diagram depicting the output torque of a controlled three phase brushless DC motor, including a torque waveform in accordance with a preferred embodiment of the present invention.

FIG. 4A is a timing diagram depicting brushless DC bus current waveforms in accordance with prior brushless DC motor drive systems, and in accordance with a preferred embodiment of the present invention.

FIG. 4B is a timing diagram depicting triggering pulses for both prior DC motor drive systems, and for a preferred embodiment of the present invention.

FIG. 4C is a timing diagram depicting a waveform corresponding to the torsional acceleration of prior motor drive systems, and a waveform corresponding to the torsional acceleration of a motor controlled in accordance with a preferred embodiment of the present invention.

DETAILED DESCRIPTION OF THE PREFERRED EMBODIMENTS

Figure 1:
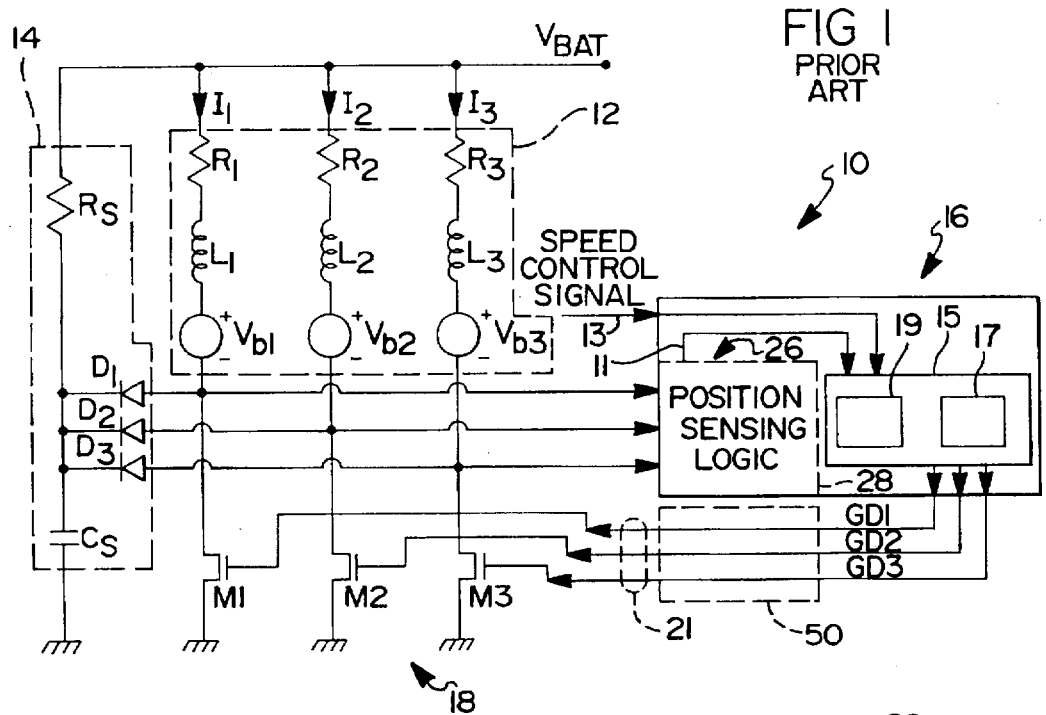
FIG. 1 is a combined block and partial schematic view of a prior art half-bridge DC motor drive system comprising an equivalent circuit of a three-phase brushless DC motor and associated prior art control and drive circuitry.

Now referring to FIG. 1, system 10 is representative of prior art systems for controlling multi-phase motors, and may be used to control a three phase half-wave permanent magnet brushless DC (PM BLDC) motor (not illustrated). The motor has a shaft which is rotatable upon energization of the windings to transmit developed torque. Alternatively, other types of multiphase motors may be controlled by system 10. The motor controlled by system 10 is represented by DC motor equivalent circuit 12. System 10 includes a snubber equivalent circuit 14, control logic or means 16, and phase commutation drivers or means 18.

As shown in FIG. 1, motor equivalent circuit 12 includes, for a three phase motor, three windings or branches. A first winding carries current $I_1$, when energized, through an equivalent resistance $R_1$, an equivalent inductance $L_1$, and generates a periodic back-emf, illustrated equivalently in FIG. 1 as a back-emf generator 20. A second winding carries current $I_2$, when energized, through an equivalent resistance $R_2$, an equivalent inductance $L_2$, and generates a back-emf, illustrated equivalently by back-emf generator 22. A third winding carries a current $I_3$, when energized, through an equivalent resistance $R_3$, an equivalent inductance $L_3$, and generates a back-emf, shown equivalently by back-emf generator 24.

The snubber circuit 14 is included in control system 10 for controlling transient voltage spikes associated with the turn-off of current in each of the motor phases. Snubber circuit 14 includes an equivalent snubber resistance $R_r$, an equivalent capacitance $C_r$, and diodes $D_1$, $D_2$ and $D_3$, respectively connected to each of the three branches of circuit 12.

Logic circuitry 16 is provided in control system 10 for sequentially energizing each branch of circuit 12 to generate respective phase currents during respective intervals. Driver circuitry 16 includes position sensing logic 26 for determining a rotor position of the motor being controlled. Position sensing logic 26 may be back-emf comparator logic 28, which is responsive to each of the generated back-emfs of the windings of circuit 12, and is operative to generate a motor rotor position signal 11 which is used by driver circuitry 16 in determining when to switch from one phase to the next (i.e., a commutation event). Alternatively, a position sensing system employing HALL sensors may be used to provide equivalent rotor position information for use by logic circuitry 16. Position sensors for determining commutation events are well known to those skilled in the motor control art. Any position sensing means may be used and remain within the spirit and scope of this invention.

Logic circuitry 16 is further responsive to speed control signal 13, as illustrated in FIG. 1, for controlling the output speed of the motor. Logic circuitry 16, in addition to gate driver circuitry 17 for energizing each branch (via energization of a respective power switch) of the controlled motor, further includes phase commutation logic 15 and Pulse Width Modulation (PWM) Logic 19. Circuitry 16 is responsive to the motor rotor position signal 11, and the speed control signal 13, and is adapted to generate respective gate drive signals (GD1–GD3) 21 for driving power switches M1, M2 and M3, respectively. The speed of the motor is varied by varying the phase voltage (by way of pulse width modulation) applied to each branch of circuit 12. The functionality of circuitry 16 is well known in the art, and is a commercially available component, such as Motorola chip MC33033.

Switches M1, M2, and M3 are disposed or wired in series with a respective branch of circuit 12. Switches M1, M2, and M3 may be N-channel MOSFET semiconductor devices, which are well known in the art. Other types of switches may be used and remain within the spirit and scope of this invention.

FIG. 2A–2D show, among other things, back-emf and current waveforms associated with the operation of the prior art multi-phase motor control and drive system 10. Particularly, FIG. 2A–2C illustrate trapezoidal back-emf waveforms 30, 32, and 34 generated by back-emf generators 20, 22, and 24, respectively. FIG. 2A–2C respectively show ideal current waveforms 36, 38, and 40 as a function of rotor position θ in electrical degrees. For simplicity and clarity, a high frequency (approximately 20 kHz), small magnitude current ripple due to the PWM action of the switches M1, M2, and M3, is not shown in the current waveforms FIG. 2A–2C. To produce a smooth torque, it is ideally necessary to position the 120° wide ideal rectangular current pulses 36, 38, and 40 in the middle of the positive half-cycle of a respective back-emf waveform. However, as discussed above in the background art portion of this application, the winding current cannot have zero rise and fall times due to a non-zero inductance associated with the windings. Accordingly, prior systems, in an effort to obtain maximum efficiency, advance the initiation of current flow in each of the windings relative to the ideal time. This advance allows the current to reach a peak when the back-emf reach its peak. Thus, typical current waveforms of each phase in prior systems resemble respective current waveforms 42, 44, and 46, as shown in FIG. 2A, 2B, and 2C. Waveforms 42, 44, and 46, show current in each phase having a finite rise and fall time. Since each current pulse is still 120° wide, the advance of the initiation of current flow establishes nominal turn-on and turn-off times (as a function of rotor position θ in electrical degrees) for a given motor speed (expressed in RPN).

Due in part to snubber circuit 14, and the back-emf generated by each phase, the rise time of an incoming winding current is greater than the fall time of the outgoing winding current, which results in a torque "dip"(as shown by waveform 48 in FIG. 2D) at every commutation event. This disturbance in the motor torque produces torsional accelerations and acoustic noise.

Figure 3:
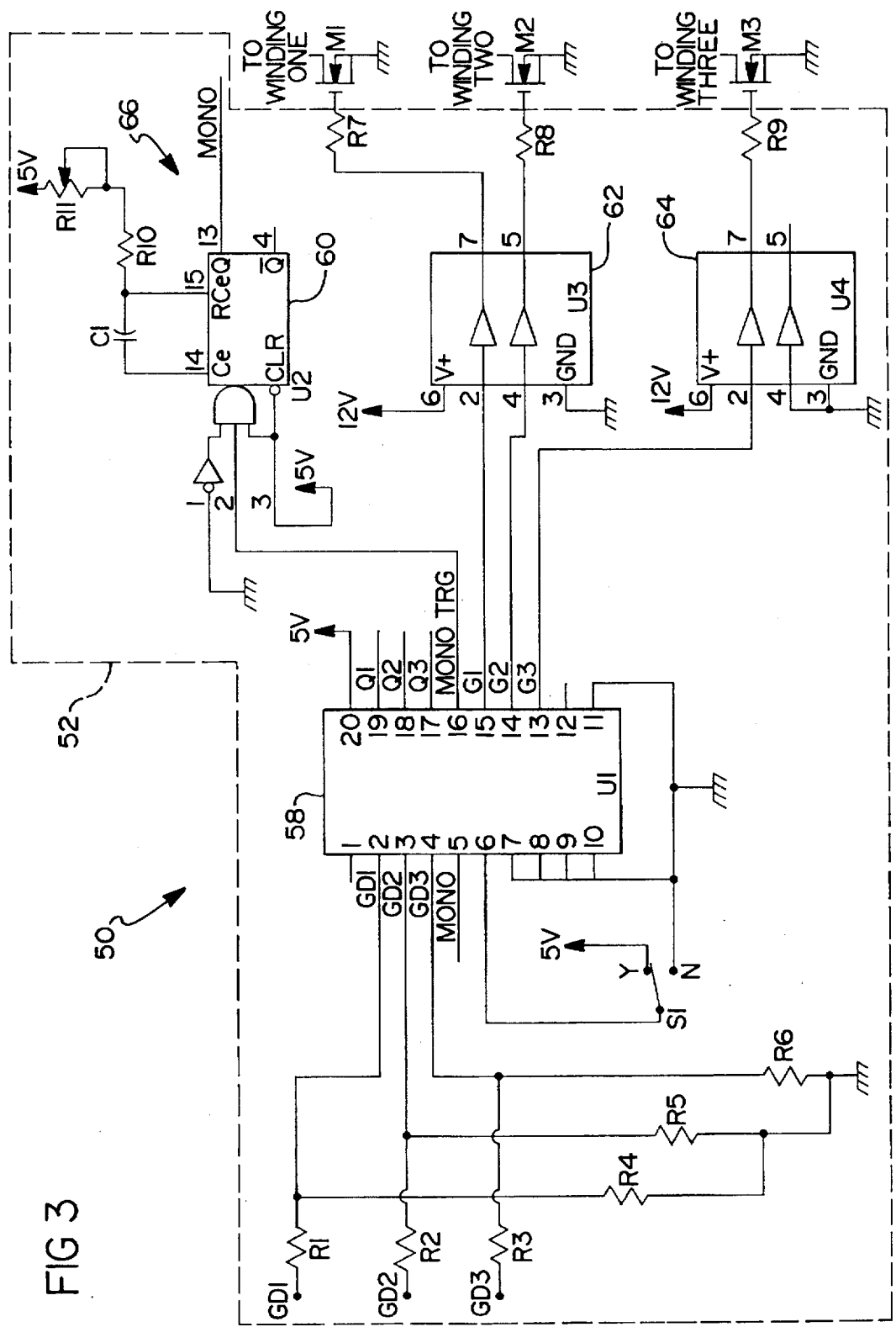
FIG. 3 is a partial schematic diagram of a means for reducing torque ripple, including a current phase overlap circuit, which, when combined with the system of FIG. 1 by being inserted into the dashed-line box in FIG. 1, forms a preferred embodiment of the present invention.

A preferred embodiment of the present invention reduces or minimizes the above-described acoustic noise arising from periodic torque dips or ripple. Referring to FIG. 1 and 3, a preferred embodiment of the present invention comprises circuit 50 for reducing motor torque ripple (FIG. 3) combined with the prior art system 10 by being inserted into the dashed-line box in FIG. 1. Preferably, circuit 50 is implemented by a circuit 52 for overlapping the intervals of current conduction of two branches, about commutation, by a preselected time.

Referring to FIGS. 1, 2A, 2C, and 3, the operation of the preferred embodiment will now be described. First, phase three of the motor is energized to generate a winding current during a first interval by driver circuitry 16 by way of actuation of switch M3 at a nominal (advanced from ideal) turn-on time. It should be appreciated that the third phase was arbitrarily selected for purposes of description to be the first phase energized; any of the three phases may be selected as the "first" phase. The back-emf, and current associated with phase three are illustrated in FIG. 2C. Next, phase one of the motor is energized (the next winding or phase in sequence) to generate another winding current (FIG. 2A) during a second interval by driver circuitry 16 by way of actuation of switch M1 at a nominal turn-on time. FIG. 2A shows that branch one is tuned on at $\theta=15°$ so that the branch current, $I_1$, can reach its desired (i.e., steady state or constant) value at $\theta=30°$ (i.e., when the back-emf of branch one reaches its maximum value). Note that branch three is, in prior art systems, nominally tuned off at $\theta=15°$ and that current $I_3$ of branch three goes to zero very quickly. The torque produced by a winding of the motor is proportional to the product of the back-emf and the branch current. If more than one branch is carrying current, then the total torque is equal to the sum of the torques produced by currents in each winding. Conversely, if none of the winding s are carrying any appreciable amount of current, then the total torque will be close to zero. Thus, in prior art systems, as illustrated by waveform 48 in FIG. 2D, there is a triangular shaped torque "dip" of a width of approximately 15°, from $\theta=15°$ to $\theta=30°$, where none of the winding s are carrying any appreciable current. This "dip" is repeated at every commutation. It should be appreciated that all the angles described above (e.g. $\theta=15°$) are motor dependent for optimization.

The present invention uses overlapping circuit 52 to reduce motor torque ripple by overlapping the above-described first and second intervals in which winding three and winding one currents flow, respectively, for a preselected time. Waveform 54 of FIG. 2C shows the phase current of winding three when controlled in accordance with the present invention. Preferably, the overlapping of phase intervals is accomplished by delaying the deenergization of an outgoing phase (i.e., phase three) by way of circuit 52 (FIG. 3), relative to its nominal tun-off time to allow current ($I_3$) to flow past the nominal tun-off time (i.e., allowing current to flow in winding three, past $\theta=15°$ to $\theta=20°$). In FIG. 2A, note that current flows in branch one (incoming phase) starting from $\theta=15°$. The present invention thus provides for an overlap, in time, of two winding currents, for a preselected time. In effect, phase three, the delayed winding carrying full current, contributes full torque and ameliorates the torque "dip" attributed to the low current carried in winding one. Assuming that the current $I_3$ in winding three does not change during the overlap (i.e., the magnetic coupling between the two phases is weak), the total motor torque will increase during the overlap (i.e., between $\theta=15°$ and $\theta=20°$) to about 1.5 times the final (nominal) value because both windings are carrying current, and thus are contributing to the motor torque. When winding three is deenergized or tuned off at $\theta=20°$, the torque will drop to about 0.5 times the final value due to the relatively rapid dropoff of winding three current. The motor torque will increase to its final value at approximately $\theta=30°$. The present invention, by way of circuit 52, thus overlaps the intervals of current conduction for the two phases (i.e., incoming and outgoing) such that the variation of the sum of the two phase torques, when compared against the final value, is reduced or minimized.

The amount of overlap period (in this example 5°) may be a function of the variation of the sum of the two torques produced by the two phase currents. For example, this overlap time may be preselected such that the peak torque is approximately 50% more than the final value (i.e., steady state) which means that the "dip" in the torque is limited to approximately 50% below the final value. It should be appreciated that, in practice, the above-mentioned targets for "overshoot" end "dip" are somewhat less than 50% of the final values. Preferably, the overlap time is selected as a function of the speed control signal, described in greater detail below. Alternatively, the overlap time period may be selected as a function of motor speed. The motor torque using the phase overlap feature of the present invention is shown in FIG. 2D as waveform 56.

As described above, the total torque is known to be equal to the sum of the individual phase torques. FIG. 2D shows a torque waveform 56 of a motor controlled in accordance with the present invention (i.e., having phase overlap) where current flows in phases one and phase three for a preselected time during commutation. The waveform 56 (with phase overlap), when compared to waveform 48 (without overlap), has the following desirable characteristics. The magnitude of the "dip" as a fraction of the nominal torque level is reduced by about a factor of two. If an area under the torque "dip" (or spike) is taken as a measure of "smoothness" of torque (or lack of it), then a factor of approximately four improvement in torque "smoothness" can be achieved by the addition of a proper amount of phase current overlap in accordance with the present invention. This "smoothness" can be seen by the shape of torque waveform 56. During commutation, the fourier components of the "ac" portion of the torque have been pushed towards higher frequencies, which can be suppressed more easily and are not likely to produce acoustical noise.

FIG. 3 shows a partial schematic diagram of overlapping circuit 52, an exemplary structure for implementing the present invention. Preferably, circuit 52 provides the means for delaying deenergization of an outgoing phase relative to the nominal turn-off time for that phase, such that the intervals respectively associated with the incoming and outgoing phase currents overlap by a preselected time. Circuit 52 includes programmable logic device 58, multivibrator chip 60, and driver/buffer chips 62 and 64.

Chip 58 is provided in circuit 52 for performing general purpose logic functions. Chip 58 is a commercially available component, which may be an EP310 from Altera. Chip 58 is programmed in accordance with the instructions found in Table 1.

TABLE 1

Module hw10k
Title 'Overlap'
    hw10k device 'e0310';
    clk pin 1;
    gd1, gd2, gd3 pin 2, 3, 4;

TABLE 1-continued

```
    q1, q2, q3 pin 19, 18, 17;
    mono pin 5;
    cntl pin 6;
    mono_trg pin 16;
    g1, g2, g3 pin 15, 14, 13;
Equations
    q1 = (gd1 # q1) & !(mono & q2)
    q2 = (gd2 # q2) & !(mono & q3);
    q3 = (gd3 # q3) & !(mono & q1);
Equations
    mono_trg=(q1 & gd2) # (q2 & gd3) # (q3 & gd1);
Equations
    g1 = gd1 # (mono & gd2 & cntl);
    g2 = gd2 # (mono & gd3 & cntl);
    g3 = gd3 # (mono & gd1 & cntl0;
end
```

In table 1, the # sign corresponds to a logic OR function and the & symbol corresponds to a logic AND function. It should be appreciated that discrete gates may be employed to achieve an identical function.

Referring to FIG. 3, inputs GD1, GD2, and GD3, (which are outputs of circuitry 16 of FIG.1) are provided as respective inputs GD1, 6D2, and GD3, by way of series resistors R1, R2, and R3, to chip 58. The inputs GD1–GD3 are pulled to ground by way of respective resistors R4–R6. Resistors R1–R3 may be 10k ohm, and resistors R4–R6 may be 5k ohm.

Circuit 52 further includes a monostable multi vibrator circuit 66. The circuit 66 includes one of the two multivibrators found on multivibrator chip 60, wherein the pulse time is programmed by selection of external capacitance C1, and an external resistance, illustrated as fixed resistor R10, in series with a variable resistor R11. The chip 60 is a commercially available component, which may be a 74HC123 from National Semiconductor. Capacitance C1 may be 0.01 microfarads, resistance R10 may be 22k ohm, and variable resistance R11 may be a 50k ohm potentiometer. The MONO output of circuit 66 is connected to the MONO input of chip 58. The driver/buffers included on chips 62 and 64 provide higher voltage and current driving capability than is provided by outputs G1–G3 of chip 58. Chips 62 and 64 are commercially available components, which may be TSC427 from Teledyne.

In operation, prior art systems, such as system 10 shown in FIG. 1, provide gate drive signals GD1–CD3, in sequence, to energize respective phases of a motor being controlled (equivalent circuit 12 in FIG. 1). Outputs G1–G3 of chip 58 drive switches M1–M3 via buffer/drivers on chips 62, 64 and resistors R7–R9, respectively. Resistors R7–R9 may be 300 ohm. In prior art systems, no two signals of gate drive signals GD1–GD3 overlap in time to simultaneously drive two phases of a half-bridge brushless DC motor. When the logic programmed into chip 58 detects a transition from one of the gate drive signals being active to the next, a MONO_TRG signal is generated by chip 58, thereby triggering monostable multivibrator circuit 66 to generate a "one-shot." Circuit 66 generates the "one-shot" or pulse having a pulsewidth or duration that determines the phase current overlap between an incoming and outgoing phase. Thus, for the duration of the pulse generated by the circuit 66, two of the gate signals G1–G3 will be asserted to energize a respective branch of the controlled motor. Preferably, the phase overlap is a function of the speed control signal. This feature may be structurally supported in the circuit 52, as resistor R11 may be controlled as a function of the speed control signal to vary the pulsewidth of the "one-shot" generated by circuit 66. In a commercial HVAC blower motor application, a fixed phase overlap of microseconds has been found to provide satisfactory reduction of torque "dips" over a broad motor speed range (see FIG. 5). This fixed overlap may be achieved by adjusting R11 to the desired overlap time.

FIG. 4A–4C show current waveforms and torsional acceleration waveforms, without phase current overlap, and with phase current overlap in accordance with the present invention. Referring first to FIG. 4B, pulses 68 represent energization of the motor phases without phase current overlap. Pulses 70 represent the energization of the motor phases with phase current overlap in accordance with the present invention.

FIG. 4A shows the waveforms indicative of the sum of all three phase currents (i.e., the DC bus current). Waveform 72 shows the DC bus current for a motor not employing phase current overlap (prior art). Waveform 74 shows the DC bus current with phase current overlap in accordance with the present invention. Because two phase currents overlap during commutation when a motor is controlled by this invention, the DC bus current shows "peaks" every commutation, as illustrated by waveform 74. Conversely, waveform 72 shows a large dropoff of current, which is proportional to developed torque, at every commutation event, due to the relatively fast dropoff of current for an outgoing phase and a relatively slow build-up of current for an incoming phase.

Referring to FIG. 4C, waveform 76 shows torsional acceleration of prior art motor systems not employing phase overlap. Waveform 78 shows torsional acceleration generated by a motor with phase current overlap in accordance with the present invention. It should be appreciated that the excursion about the axis is much less for waveform 78 than for waveform 75. The "smoothness" of operation obtained by the present invention is thus superior to a standard motor operated without any torque ripple compensation.

Figure 5:
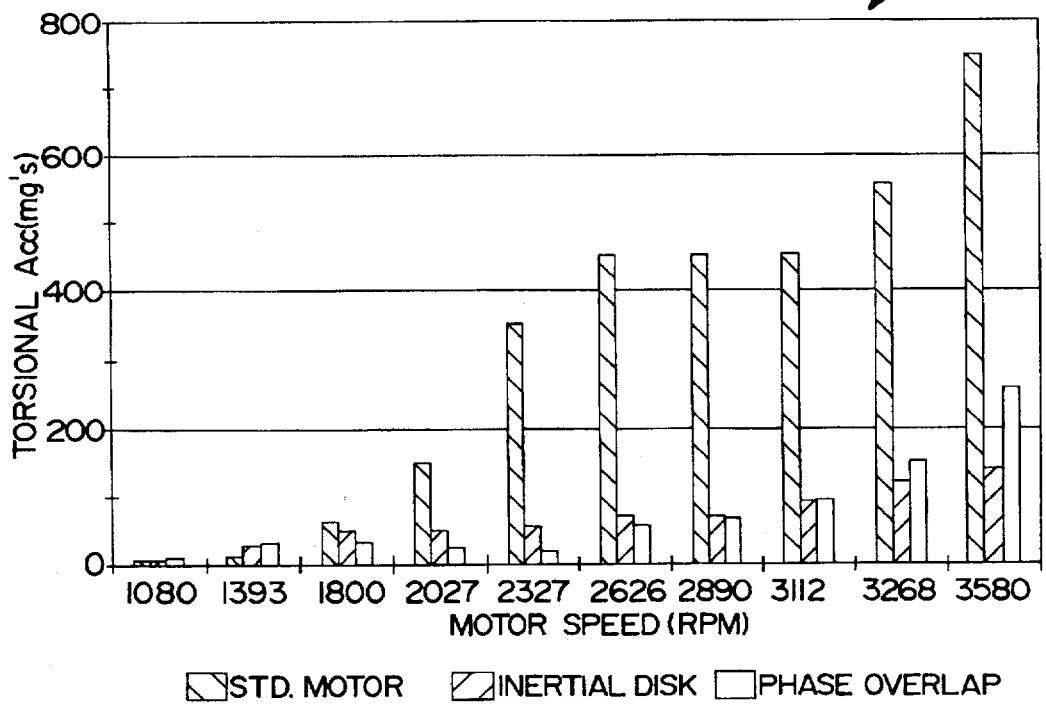
FIG. 5 is a bar chart diagram depicting the torsional acceleration of a standard motor, a motor employing a prior art "inertial disk", and a motor controlled in accordance with a preferred embodiment of the present invention.

FIG. 5 shows a bar chart diagram depicting torsional acceleration for a standard motor controlled in accordance with a prior art control system 10, a motor controlled in accordance with a prior art system 10 but further equipped with an "inertial disk," and a motor having phase current overlap in accordance with the present invention. It should be appreciated that the reduction in torsional acceleration achieved by the present invention is at the very least comparable to that achieved by prior art "inertial disk" solutions, without the penalty of additional cost and mass.

The advantages of controlling a multi-phase brushless DC motor is accordance with this invention include the ability to reduce torsional acceleration transmitted to mounting systems, which in turn generate acoustical noise, to a degree comparable to prior art mechanical solutions without the penalties incurred by using such techniques. Due to the phase current overlap control of the present invention, the torsional acceleration at the commutation frequency has been decreased by a factor of 8, while the audible noise has been reduced by 6 db.

The preceding description is exemplary rather than limiting in nature. A preferred embodiment of this invention has been disclosed to enable one skilled in the art to practice this invention. Variations and modifications are possible without departing from the purview and spirit of this invention; the scope of which is limited only by the appended claims.

What is claimed is:

1. In a system having a motor, the motor having plurality of windings, a method of energizing the windings for reducing motor torque ripple, comprising the steps of:

energizing a first winding of the motor to generate a first phase current:

energizing a second winding of the motor to generate a second phase current and, overlapping the first and second phase currents by a preselected time to reduce motor torque ripple wherein the system includes a speed control signal for controlling the speed of the motor, and wherein said overlapping step includes the substep of determining the preselected time as function of the speed control signal.

2. The method of claim 1 wherein said overlapping step is performed such that said first and second phase currents overlap in a predetermined relationship with respect to a back-emf produced by said first and second windings.

3. In a system having a motor, the motor having a plurality of windings, a method of energizing the windings for reducing motor torque ripple, comprising the steps of:

energizing a first winding of the motor to generate a first phase current;

energizing a second winding of the motor to generate a second phase current; and, overlapping the first and second phase currents by a preselected time to reduce motor torque ripple wherein the motor has a speeds said overlapping step including the substep of determining the preselected time as a function of the motor speed.

4. The method of claim 3 wherein said overlapping step is performed such that said first and second phase currents overlap in a predetermined relationship with respect to a back-emf produced by said first and second windings.

5. In a system having a motor, the motor having plurality of windings, a method of energizing the windings for reducing motor torque ripple, comprising the steps of:

energizing a first winding of the motor to generate a first base current;

energizing a second winding of the motor to generate a second phase current; and, overlapping the first and second phase currents by a preselected time to reduce motor torque ripple wherein said overlapping step includes the substep of determining the preselected time as a function of motor torque variation.

6. The method of claim 5 wherein said substep of determining the preselected time includes the substep of determining the preselected time such that motor torque overshoot is approximately equal to motor torque dip.

7. The method of claim 5 wherein said overlapping step is performed such that said first and second phase currents overlap in a predetermined relationship with respect to a back-emf produced by said first and second windings.

8. A system for controlling a motor to reduce motor torque ripple, the motor having a plurality of windings each carrying a respective winding current comprising:

means for energizing a first one of said winding to generate a first winding current during a first interval;

means for energizing a second one of said windings to generate a second winding current during a second interval; and, means for overlapping said first and second intervals for a preselected time such that a variation of motor torque is minimized wherein each winding has a respective nominal turn-on and turn-off times, and wherein said overlapping means includes means for delaying deenergization of said first winding relative to said nominal first winding turn-off time so that said first and second intervals overlay by said preselected time, said delaying means includes means for varying said preselected time as a function of a speed control signal.

9. The system of claim 8 wherein said overlap of said first and second intervals occurs in a predetermined relationship with respect to a back-emf produced by said first and second windings.

10. A motor system, comprising:

a motor having a plurality of windings each carrying a respective phase current wherein the sum of said phase currents is known to be proportional to motor torque, said motor having a shaft rotatable upon energization of said windings;

means for energizing a first one of said windings to generate a first phase current during a first interval;

means for energizing a second one of said windings to generate a second phase current during a second interval; and, means for reducing torque ripple of said shaft by overlapping said first and second intervals by a preselected time such that a variation of motor torque is minimized, wherein each winding has a respective nominal turn-on and turn-off times, and wherein said reducing torque ripple means includes means for delaying deenergization of said first winding relative to said nominal first winding turn-off time so that said first and second intervals overlap by said preselected time, said delaying means includes means for varying said preselected time as a function of a speed control signal.

11. The system of claim 10, wherein said motor is a permanent magnet brushless direct current motor.

12. The system of claim 10 wherein said overlap of said first and second intervals occurs in a predetermined relationship with respect to a back-emf produced by said first and second windings.

13. An apparatus for controlling a motor, the motor having a plurality of windings, comprising:

position sensing logic for generating a motor rotor position signal;

phase commutation logic responsive to said motor rotor position signal for generating first and second gate drive signals, said first and second gate drive signals being operative to energize a respective winding of the motor when active to generate respective first and second currents, each gate drive signal being active during respective non-overlapping intervals; and, an overlap circuit having transition logic to detect a transition of an active state between said first and second gate drive signals and generate a trigger signal in response to said detected transition, said overlap circuit further having a delay circuit responsive to said trigger signal for generating a delay signal, said transition logic being responsive to said delay signal for overlapping by a preselected time the time in which said first and second gate drive signals are active.

14. The apparatus of claim 13, wherein said delay circuit is responsive to a speed control signal.

15. The apparatus of claim 13, wherein said preselected time is proportional to a duration of said delay signal.

16. The apparatus of claim 13, wherein a duration of said delay signal is proportional to a speed control signal.

17. The apparatus of claim 13, wherein said delay circuit includes a monostable multivibrator.

* * * * *

UNITED STATES PATENT AND TRADEMARK OFFICE
CERTIFICATE OF CORRECTION

PATENT NO.  : 5,672,944
DATED       : Sep. 30, 1997
INVENTOR(S) : Gokhale et al.

It is certified that error appears in the above-indentified patent and that said Letters Patent is hereby corrected as shown below:

Col. 8, line 65, insert the word "a" before "plurality".
Col. 9, line 25, the word "speeds" should read --speed,--.
Col. 9, line 32, insert the word "a" before "plurality".
Col. 9, line 36, change the word "base" to --phase--.
Col. 9, line 56, the word "winding" should read -- windings--.

Signed and Sealed this

Twenty-third Day of December, 1997

Attest:

BRUCE LEHMAN

*Attesting Officer*           *Commissioner of Patents and Trademarks*